US012585572B1

(12) United States Patent
Walter et al.

(10) Patent No.: US 12,585,572 B1
(45) Date of Patent: Mar. 24, 2026

(54) TRACKING EVENTS OF INTEREST IN A LIVE PRODUCTION ENVIRONMENT

(71) Applicant: Hud Software Platforms Ltd., Tel Aviv (IL)

(72) Inventors: May Walter, Tel Aviv (IL); Roee Adler, Tel Aviv (IL); Afic Joshua, Tel Aviv (IL); Shani Armon, Modiin-Macabim-Reut (IL)

(73) Assignee: Hud Software Platforms Ltd., Tel Aviv (IL)

( * ) Notice: Subject to any disclaimer, the term of this patent is extended or adjusted under 35 U.S.C. 154(b) by 0 days.

(21) Appl. No.: 19/306,627

(22) Filed: Aug. 21, 2025

(51) Int. Cl.
*G06F 11/362* (2025.01)

(52) U.S. Cl.
CPC .................................. *G06F 11/364* (2013.01)

(58) Field of Classification Search
CPC ...................................................... G06F 11/364
See application file for complete search history.

(56) References Cited

U.S. PATENT DOCUMENTS

| | | | | | |
|---|---|---|---|---|---|
| 11,469,974 | B1 * | 10/2022 | Cruise | ................. | G06F 11/3006 |
| 11,657,154 | B2 * | 5/2023 | Conikee | ................. | G06F 21/577 |
| | | | | | 726/22 |
| 11,792,086 | B1 * | 10/2023 | Singwi | ................. | H04L 41/0897 |
| | | | | | 709/226 |
| 2018/0091591 | A1 * | 3/2018 | Puri | ................. | H04L 67/1031 |
| 2020/0341777 | A1 * | 10/2020 | Kashyn | ................. | G06F 11/3636 |
| 2022/0014533 | A1 * | 1/2022 | Almaz | ................. | H04L 43/16 |
| 2022/0311794 | A1 * | 9/2022 | Maya | ................. | G06F 11/0766 |
| 2023/0042508 | A1 * | 2/2023 | Agarwal | ................. | H04L 67/1097 |
| 2023/0153224 | A1 * | 5/2023 | Liu | ................. | G06F 11/3466 |
| | | | | | 714/45 |
| 2023/0388332 | A1 * | 11/2023 | Cunningham | ........ | G06F 21/552 |
| 2025/0007799 | A1 * | 1/2025 | Johnson | ................. | H04L 43/08 |
| 2025/0123872 | A1 * | 4/2025 | Corrie | ................. | G06F 9/45558 |
| 2025/0257890 | A1 * | 8/2025 | Leneau | ................. | G05B 13/0265 |
| 2025/0258708 | A1 * | 8/2025 | Crabtree | ................. | G06F 9/5027 |

FOREIGN PATENT DOCUMENTS

| | | | | | |
|---|---|---|---|---|---|
| CN | 116584085 | A * | 8/2023 | ........... | H04L 41/046 |
| CN | 117252505 | A * | 12/2023 | ......... | G06Q 10/0833 |
| CN | 120111555 | A * | 6/2025 | ......... | G06F 11/3668 |
| JP | 2025104133 | A * | 7/2025 | | |

* cited by examiner

*Primary Examiner* — Daxin Wu
(74) *Attorney, Agent, or Firm* — Myers Wolin, LLC

(57) ABSTRACT

A method, product and system for monitoring target software operating in a live production environment. The system includes an edge device executing the target software and a backend server. The edge device initiates endpoint tracking upon identifying a service-level entry point, automatically monitoring function invocations within the execution flow. During execution, the system determines whether to open an investigation based on detecting a triggering event and computing a signature derived from descriptors of the endpoint, function, and event. Upon completion of the execution flow, if an investigation was opened, the system classifies the signature as an incident or non-incident event based on the execution result. Data, including the signature, is selectively transmitted to the backend server for further processing.

19 Claims, 3 Drawing Sheets

TRACK A SERVICE-LEVEL ENTRY POINT    210

IDENTIFY AN OCCURRENCE OF A TRIGGERING EVENT    220

DETERMINE A SIGNATURE OF THE OCCURENCE    230

MATCH AGAINST A DATABASE    240

DETERMINE WHETHER TO PERFORM CONTEXTUAL INSPECTION    250

ACCUMULATE AND REPORT DATA    260

GENERATE INSIGHTS    270

TRACKING EVENTS OF INTEREST IN A LIVE PRODUCTION ENVIRONMENT

TECHNICAL FIELD

The present disclosure relates to computer systems in general, and to tracking failure events in a live production environment, in particular.

BACKGROUND

A service-level failure occurs when an endpoint, such as an API call, terminates abnormally. For example, the endpoint may return an error status, time out, or otherwise abort, thereby indicating that the execution flow originating at that endpoint did not complete as intended.

A function failure occurs when an individual function invocation within an execution flow raises an exception, assertion, or other error condition that prevents the function from producing its expected result. In such cases, the function invocation is deemed unsuccessful.

BRIEF SUMMARY

One exemplary embodiment of the disclosed subject matter is a system for monitoring a target software that is executed in a live production environment, the system comprising: an edge device executing the target software in the live production environment; a backend server; the edge device is configured to: initiate an endpoint tracking for tracking an execution flow of an endpoint of the target software, in response to identifying a service level entry point of the endpoint of the target software, wherein the tracking the execution flow of the endpoint comprises automatically monitoring invocations of functions within the execution flow of the endpoint; determine whether to open an investigation to investigate a result of the execution flow of the endpoint, the determination of whether to open the investigation is based on: identifying an occurrence of a triggering event during tracking of the execution flow of the endpoint, the occurrence of the triggering event occurs during an execution of a function of the target software; and a signature of the occurrence of the triggering event, the signature is computed based on: a descriptor of the endpoint, a descriptor of the function, and a descriptor of the triggering event; in response to reaching an end of the execution flow of the endpoint, and in case of an open investigation, tag the signature as an incident event or a non-incident event based on the result of the execution flow of the endpoint; selectively send data regarding the execution flow of the endpoint to said backend server, wherein the data comprises at least the signature.

Optionally, the selective sending of the data regarding the execution flow of the endpoint comprises: in case the signature is tagged as the incident event, sending an indication of the occurrence of the triggering event; and selectively sending contextual data of the incident event.

Optionally, the contextual data is sent based on a determination that: the triggering event was never encountered before; the triggering event was not encountered during a sliding window; or a user request regarding the triggering event.

Optionally, the contextual data of the occurrence of the triggering event comprises a stack trace at a time of the occurrence of the triggering event.

Optionally, the edge device is configured to identify, during the execution flow, multiple occurrences of multiple triggering events, wherein the data comprises multiple signatures of the multiple triggering events.

Optionally, the data comprises: values of parameters of the function, wherein the values of the parameters of the function are obtained after the determination to open the investigation.

Optionally, the data comprises: a chain of function invocations leading to the occurrence of the triggering event.

Optionally, the triggering event comprises a function exception within the execution flow of the endpoint.

Optionally, the triggering event is a throw of an exception during the execution of the function, wherein the data comprises: a descriptor of the exception and a payload of the exception.

Optionally, the triggering event is a performance event of the function, wherein the data comprises: a performance measurement.

Optionally, the triggering event comprises a performance threshold that is breached by at least one of: the function and the endpoint.

Optionally, the system comprises a tagged signature database, wherein said edge device is configured to update said tagged signature database with the tag of the signature, wherein said determination of whether to open the investigation comprises: querying the tagged signature database to determine whether the signature matches a cluster of signatures within said tagged signature database; and determining to open the investigation in case the signature does not match any cluster of said tagged signature database.

Optionally, said tag the signature comprises tagging the signature as the incident event in case the result of the execution flow of the endpoint is a failure, and tagging the signature as the non-incident event in case the result of the execution flow of the endpoint is a success.

Optionally, the selective sending of the data is performed at the end of the execution flow.

Another exemplary embodiment of the disclosed subject matter is a method comprising: in response to identifying a service level entry point of an endpoint of a target software, initiating an endpoint tracking for tracking an execution flow of the endpoint of the target software, wherein the endpoint tracking comprises automatically monitoring invocations of functions within the execution flow of the endpoint, wherein the target software is executed in a live production environment; during the endpoint tracking, identifying an occurrence of a triggering event, the triggering event occurs during an execution of a function of the target software; in response to the occurrence of the triggering event, calculating a signature of the occurrence of the triggering event; based on the signature of the occurrence, determining whether to collect contextual data of the occurrence of the triggering event; based on the signature of the occurrence, determining whether to tag the signature of the occurrence; in response to a determination to tag the signature of the occurrence, identifying a return event of the endpoint; based on a result of the return event, tagging the signature of the occurrence as an incident event or a non-incident event; and selectively sending data regarding the execution flow of the endpoint to a backend server, wherein the data comprises at least the signature.

Yet another exemplary embodiment of the disclosed subject matter is a computer program product comprising a non-transitory computer readable medium retaining program instructions, which program instructions when read by a processor, cause the processor to: in response to identifying a service level entry point of an endpoint of a target software, initiate an endpoint tracking for tracking an execution flow of the endpoint of the target software, wherein the endpoint tracking comprises automatically monitoring invocations of functions within the execution flow of the endpoint, wherein the target software is executed in a live production environment; during the endpoint tracking, identify an occurrence of a triggering event, the triggering event occurs during an execution of a function of the target software; in response to the occurrence of the triggering event, calculate a signature of the occurrence of the triggering event; based on the signature of the occurrence, determine whether to collect contextual data of the occurrence of the triggering event; based on the signature of the occurrence, determine whether to tag the signature of the occurrence; in response to a determination to tag the signature of the occurrence, identify a return event of the endpoint; based on a result of the return event, tag the signature of the occurrence as an incident event or a non-incident event; and selectively send data regarding the execution flow of the endpoint to a backend server, wherein the data comprises at least the signature.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
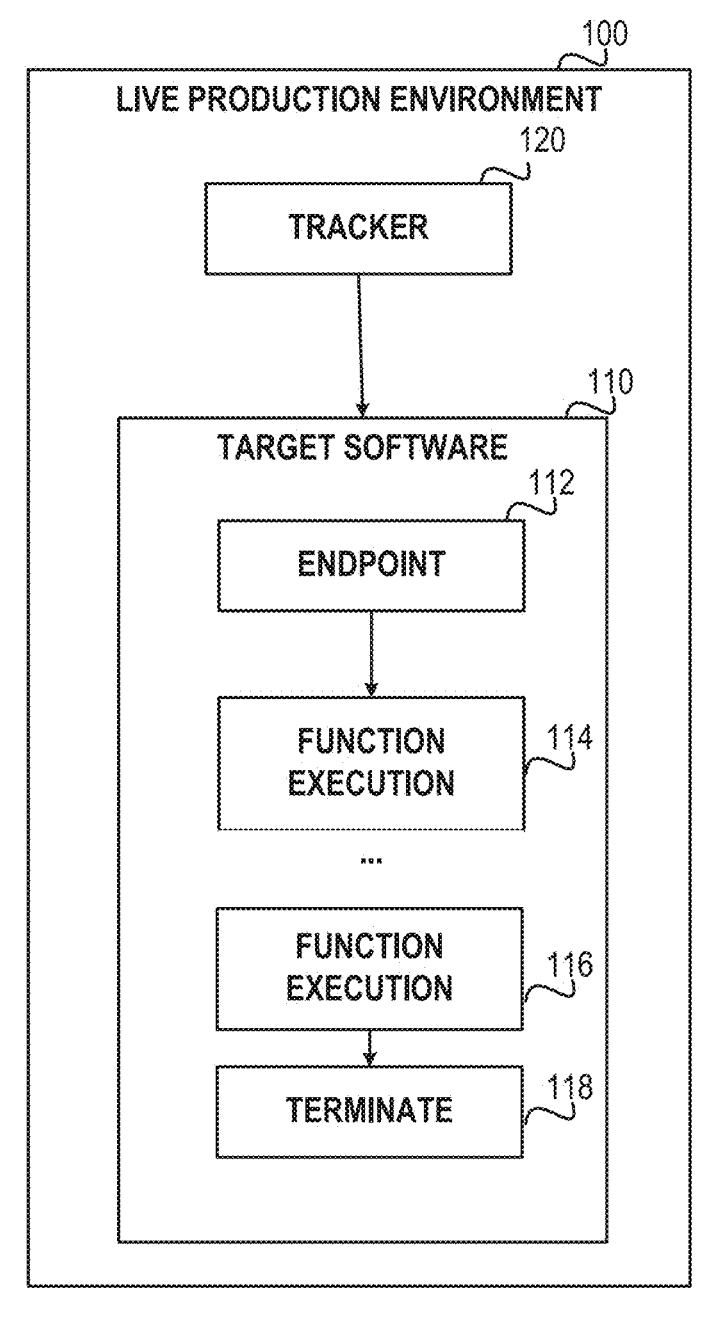
FIG. 1 shows an exemplary environment in which the disclosed subject matter may be utilized, in accordance with some exemplary embodiments of the disclosed subject matter.

One technical problem dealt with by the disclosed subject matter is tracking contextual data related to endpoint failures.

In some exemplary embodiments, an endpoint represents the entry point to a service, a specific functionality of an Application Programming Interface (API) call, any entry event or network request that triggers an execution flow, or the like. For example, an endpoint may comprise an API endpoint, a service entry point, a webhook trigger, a scheduled task such as a cron job, a message-queue consumer, or the like. In some exemplary embodiments, an endpoint may constitute the starting point of the call chain, e.g., a chain of function calls. The endpoint may initiate the chain of function calls, and may serve as the initial point of interaction with an API, defining the particular service or action being requested. For example, in a user management system, endpoints may comprise operations such as "create user," "update user," and "delete user".

In some exemplary embodiments, tracking contextual data related to endpoint failures may be challenging since service-level failures manifest only at the end, or tail, of the execution path. For example, for the endpoint request "create user", a failure of implementing the request may manifest only at the end of the execution path, such as by a timeout or crash. In some exemplary embodiments, conventional observability stacks have no opportunity to record fine-grained context of service-level failures while the execution flow is still live. By the time the failure manifests it is already too late to gather the contextual data required to identify the failure's root cause. In some exemplary embodiments, when an endpoint fails, engineers may have only coarse metrics to work with; crucial details such as call stacks, input parameters, and precise timing are lost. It may be desired to overcome this challenge.

Another technical problem dealt with by the disclosed subject matter is correlating failures that occur in individual functions with the endpoints that initiated the execution flows in which those functions run.

A request may originate at an endpoint, traverse an execution flow, and encounter a downstream function that raises an exception. In some exemplary embodiments, when a function invocation raises an exception or otherwise fails, it may be challenging to obtain sufficient context regarding the function failures. For example, it may be challenging to determine whether that failure affected the functionality of the originating endpoint and caused the endpoint to fail, return an error, or the like. It can be difficult to assess the exception's impact on the overall request, e.g., whether it caused the endpoint to fail, whether the endpoint completed successfully despite the exception, or whether the endpoint failed for an unrelated reason. Existing telemetry pipelines do not associate an endpoint's outcome with the exceptions that precipitated it in real time, thereby leaving a data gap that may be challenging to bridge. For example, in case the exception was handled, it may not necessarily affect the endpoint request. As another example, it may be challenging to determine, as context, the call chain leading to an exception from an endpoint request. Once an exception has been raised, retrospectively collecting data about its root causes may be challenging. For example, since existing observability tools collect detailed data after a failure, and cannot predict failures ahead of time, it may not know when to collect contextual data, and it may not be feasible to collect all the contextual data continuously (as this may create significant overhead and render the service unusable). It may be desired to address the above challenges.

Yet another technical problem dealt with by the disclosed subject matter is tracing failures of endpoints within a live production environment. For example, a target software may be deployed and executed within a live production environment, and it may be desired to trace failures and errors of the target software with the live production environment, e.g., in order to enhance the target software, fix errors, or the like.

In some exemplary embodiments, data collection in live production environments may be resource consuming, which may limit the ability to collect data on a constant basis. For example, services that log every function call, parameter, and stack trace rapidly exhaust Central Processing Unit (CPU) resources, network resources, and memory or storage budgets, forcing operators to sample fine-grained data or disable fine-grained logging completely, thereby leaving critical blind spots. In some exemplary embodiments, it may be desired to overcome this drawback, and to trace endpoint failures in live production environments while reducing the resource consumption.

Yet another technical problem dealt with by the disclosed subject matter is tracking contextual data related to software failures, for software written in dynamic languages, interpreted languages, or the like. For example, a dynamic language such as Python™, JavaScript™, Ruby™, PHP™, Lua™, and Perl™ may be languages whose key semantic decisions are deferred to runtime rather than fixed at compile time. In such languages, method dispatch is resolved at run-time; consequently, the precise source of an exception is often determined only after execution begins. This late binding obscures the origin of the failure and complicates root-cause analysis. It may be desired to overcome this drawback.

Yet another technical problem dealt with by the disclosed subject matter is tracking contextual data related to certain performance metrics of function executions, such as deviations of performance metrics from a typical behavior.

Yet another technical problem dealt with by the disclosed subject matter is utilizing logging infrastructure associated with failures of endpoints into a development environment. Tools within the development environment may lack access to production data, and may not be informed of the relationship between endpoints and function exceptions within their execution flow. For example, development environments that employ language models such as Artificial intelligence (AI) language models, Large-Language Models (LLMs), or the like, may not have access to such data. The absence of reliable, real-time links between each exception and the endpoint or flow that triggered it, deprives language models of essential context, especially in dynamic languages. Without this data, the capabilities of language models to analyze failures may be limited and suboptimal. It may be desired to overcome this drawback.

One technical solution provided by the disclosed subject matter is opening a lightweight tracking for every endpoint invocation in a target software that is executed in a live production environment, and determining to perform a "deep contextual inspection" based on one or more triggering events of the execution flow, one or more additional conditions, or the like. For example, a deep contextual inspection may comprise capturing rich contextual data, also referred to as "forensics", "contextual data", or the like, when a defined triggering event is encountered. As another example, a deep contextual inspection may comprise switching from the lightweight tracking to a full tracking mode that tracks additional context.

In some exemplary embodiments, the disclosed subject matter may be implemented by a Software Development Kit (SDK), a sensor, a software agent, logging tool, or the like, employed within a live production environment. For example, the SDK may be executed on an edge device executing the target software.

In some exemplary embodiments, upon identifying an endpoint invocation or request, the lightweight tracking for the endpoint may be activated. For example, for each endpoint invocation in the live production environment, a lightweight tracking of the endpoint's execution flow may be activated by opening a respective tracker object. In some exemplary embodiments, during the lightweight tracking, the execution flow of an endpoint may be tracked in a partial lightweight mode, by logging only basic data such as the endpoint's identifier (ID), timestamps of one or more events such as identified errors, occurrences of events defined by user-defined metrics, occurrences of function exceptions, function invocations, or the like. In some cases, the basic data may comprise lightweight data, tracking of which incurs negligible overhead. For example, the deep contextual inspection may capture rich, more expansive contextual data, consuming a greater number of network and memory resources than the lightweight tracking In some exemplary embodiments, the lightweight tracking may be configured to enable a detection of one or more defined triggering events. For example, triggering events may comprise function exceptions, latency thresholds, on-demand flags, performance spikes, user-defined metrics, or the like. In some exemplary embodiments, triggering events may be defined by one or more trigger conditions that are evaluated and tracked during the lightweight tracking to identify compliance therewith. In some exemplary embodiments, the trigger conditions may comprise a set of one or more conditions that are evaluated at the service level, at the function level, or the like.

In some exemplary embodiments, the lightweight tracking mode may track compliance with the trigger conditions. For example, in case a trigger condition comprises identifying a certain type of exception thrown by a certain function in an execution flow of a certain endpoint, the lightweight tracking mode may track exceptions of all instances of the function that are executed within the execution flow of the named endpoint, to identify compliance with the trigger condition. In case of compliance, the identified exception may be classified as a triggering event. As another example, a trigger condition may comprise identifying a certain type of exception thrown by a certain function after a certain call chain. As another example, a trigger condition may comprise a performance metric of a certain function, e.g., its execution duration is greater than 5 seconds. As another example, a trigger condition may comprise a user-defined event such as tracking a next execution of a defined function, tracking the function in case its next invocation exceeds a percentile 99.9 performance threshold, or the like.

In some exemplary embodiments, a triggering event may represent a suspected issue, or potential issue, that may not necessarily be of interest. For example, a triggering event that was identified a thousand times in a last sliding window may not necessarily be of interest for tracking purposes (e.g., since the SDK may already have sufficient information regarding the event). As another example, a triggering event that never caused the endpoint request to fail in the past, may not be of interest for tracking purposes.

In some exemplary embodiments, in response to identifying an occurrence of a triggering event, the SDK may determine whether a deep contextual inspection should be performed, e.g., based on whether the triggering event is likely to be of interest. For example, a decision to perform a deep contextual inspection, also referred to as 'opening an investigation', may be made based on one or more additional conditions, such as conditions associated with the triggering event. In some exemplary embodiments, a determination to perform a deep contextual inspection may be based on a signature of the occurrence of the triggering event.

In some exemplary embodiments, a signature of the occurrence of the triggering event may be generated, determined, calculated, extracted, or the like. In some exemplary embodiments, the signature may be generated in response to identifying the occurrence of the triggering event for a given endpoint execution flow. In some exemplary embodiments, the signature may be generated based on one or more fields, data points, or the like, such as an endpoint identifier, a function identifier, a descriptor of the triggering event, an error descriptor or name, an error payload or message, a type of a thrown exception, version data of the target software such as a commit hash, or the like. For example, the signature may be generated by concatenating or hashing the endpoint identifier, the function identifier, and/or a descriptor of the triggering event.

In some exemplary embodiments, the generated signature may be compared to a signature database of previously observed signatures of triggering events. In some exemplary embodiments, the signature database may be initialized on a periodic basis, per session, or the like. For example, the database may reflect occurrences of triggering events within a sliding window. In other cases, the signature database may be set with pre-set or global values that may be retrieved by the SDK every process, defined period, or the like, and may remain persistent across sessions. The database may reside locally (in-process), on the edge device, on a remote server, on a cloud, or the like. For example, the edge device executing the SDK may have access to the database.

In some exemplary embodiments, the comparison to the database may be performed in order to determine whether the triggering event, or a cluster to which it is classified, was encountered before. This may enable to reduce duplicate calculations, duplicate tracking resources, duplicate capturing of contextual data, or the like, such as by not necessarily performing a deep contextual inspection in case of triggering events that were encountered before. It is noted that the signature may be generated and the comparison may be performed before the SDK is informed of the result of the return event of the execution flow, since the execution flow of the endpoint may not yet reach an end. The comparison to previously encountered signatures may enable to estimate or predict the result of the execution flow, before it is reached, and to estimate whether or not the triggering event is of interest.

In some exemplary embodiments, in case the signature does not match any existing entry in the database, or cannot be assigned to any cluster of signatures within the database, an investigation of the execution flow may be opened, a deep contextual inspection may be performed, or the like. For example, the deep contextual inspection may comprise capturing rich contextual data, switching the tracking mode from the lightweight tracking mode to a full tracking mode, or the like. In some cases, the deep contextual inspection may comprise capturing the contextual data, and continuing the tracking of the endpoint's execution flow until reaching an end of the execution flow.

For example, during a deep contextual inspection, the SDK may gather contextual data such as a stack trace at a time of the triggering event, parameter values of the function in which the triggering event occurred, a call chain of the function, parameter values of previous functions in the call chain, service parameters, or the like. In some cases, different contextual data may be gathered for different triggering events. For example, a stack trace may be accumulated for exceptions, but not for performance-related events. Regardless of the deep contextual inspection, the SDK may gather and report basic lightweight data such as an indication of an occurrence of a triggering event, an identifier or descriptor of the originating endpoint, the endpoint API, a descriptor of the exception, a payload of the exception, a performance measurement, latency spikes, a call chain, or the like.

In some cases, based on the tracking, the SDK may identify whether the execution flow ends successfully or in a failure, and the signature may be tagged accordingly at an end of the execution flow, and added to the database as a new entry. For example, the signature may be tagged as an incident or a non-incident, based on a result of the execution flow, and a new entry may be generated to include the signature and the tag. The new entry may be added to the database. For example, in case the execution flow resulted in a 500-series error, a slowdown, or the like, the signature may be tagged as an incident. As another example, in case a measured performance of the function during the execution flow complies with a defined performance criterion, the signature may be tagged as an incident.

In some exemplary embodiments, in case the signature is tagged as an incident, the captured contextual data may be reported to a backend server, such as to process the newly encountered incident event and perform further analysis. In some exemplary embodiments, the contextual data may be reported along with an indication of the occurrence of the triggering event, the signature of the instance, a tag of the instance, a result of the execution flow, or the like. In some cases, in case a full tracking mode was activated, contextual data of subsequent events or subsets thereof may or may not be captured and reported. In some cases, the remaining execution flow may be tracked using the lightweight tracking, without capturing additional contextual data.

In some exemplary embodiments, in case of a non-incident, when the result of the execution flow is a success, the signature may be tagged as a non-incident. In such cases, the contextual data may not necessarily be reported to a server, e.g., to reduce overhead. In some exemplary embodiments, the reported data may comprise lightweight data such as an indication of the occurrence of the triggering event, the signature of the instance, a tag of the instance, a result of the execution flow, or the like, but may be absent of the contextual data. In other cases, the report may comprise the contextual data or portion thereof.

In some exemplary embodiments, in case the signature matches an existing entry in the database (or its cluster), a deep contextual inspection may be determined to be performed based on the tagging of the existing entry, tagging of signatures belonging to the signature's cluster, a count of occurrences of each matching signature, or the like.

In some exemplary embodiments, in case the existing entry represents an "incident" entry (e.g., is tagged as "incident" in the database), a deep contextual inspection may be performed based on one or more rules, conditions, or the like, such as based on a number of previous occurrences of the signature. For example, a counter may be employed to count a number of instances of each triggering event, a number of occurrences of a signature, or the like, and in case the number exceeds a threshold (e.g., three times, four times, or the like), the deep contextual inspection may not be performed. For example, in such cases, contextual data may not be extracted, an investigation may not be opened, or the like. According to this example, the SDK may report lightweight data such as the occurrence of the incident (its instance), e.g., to adjust a count of the signature instances at an analysis server.

As another example, in case the number of instances of a triggering event is lesser than the threshold or equal thereto, the deep contextual inspection may be performed. For example, the deep contextual inspection may comprise accumulating extended contextual data associated with the triggering event. In case the number of instances of the triggering event is lesser than the threshold, no tracking may be needed for tagging of the signature, since it may be tagged already. In other cases, the execution flow's return event may be tracked and the result of the return event may be used to adjust the tag, e.g., in case of obtaining an alternative result. For example, the signature may be tagged with a probability of reaching each result.

In some exemplary embodiments, in case the signature matches an existing entry in the database, or matches a cluster of signatures thereof, and the existing entry represents a "non-incident" entry (e.g., is tagged as "non-incident"), the deep contextual inspection may not be performed, e.g., to reduce resource consumption. In some cases, instead of gathering and/or reporting contextual data to the server, only the basic lightweight data may be gathered and/or reported.

In some exemplary embodiments, by focusing on new occurrences of triggering events and on events that are expected to result with an incident, accumulation of heavy contextual data is reduced while maintaining a high level of data completeness for actual failures. The data completeness is balanced with reduced overhead, that has minimal impact on production latency. In some exemplary embodiments, if the endpoint request succeeds, the signature is tagged as a non-incident, preventing redundant analysis for benign patterns, e.g., reducing the communication overhead.

In some exemplary embodiments, a reporting of contextual data that is extracted by the SDK during a deep contextual inspection to a backend server may be deferred until after the execution flow is closed, to avoid adding latency to the client that invoked the endpoint request. For example, this may enable to maintain the performance of the endpoint request. In other cases, the reporting of contextual data may be performed at any other stage of the execution flow.

In some exemplary embodiments, the reported data from the SDK may be obtained at one or more analysis devices, backend servers, clouds, or the like. In some exemplary embodiments, the reported data may be ingested and/or processed to generate code insights, failure insights, to bridge a data gap, or the like. For example, generated insights may be presented to developers within a developing environment such as an IDE. For example, the IDE may present to users identified incident events, their types, an endpoint flow to which they belong, a number of their instances, rich contextual data of the incident events, performance metrics (date last seen, rate of instances per day), filters per selected timeframe, or the like.

In some cases, the reported data may be made accessible to one or more language model engines, as raw data, processed data, or the like. For example, the reported data may be processed by a Model Context Protocol (MCP) layer of one or more LLM engines. In some exemplary embodiments, the MCP layer may enable LLM engines to provide informed answers to user prompts, by taking into account the reported data. As another example, the data may be pre-processed to formats that are easily processed by MCP layers, e.g., as JSON telemetry. As another example, the data may be processed to be structured as a prompt with a predefined section, asking the LLM engine to explain why the incident happened and to propose a solution in view of the reported data, thereby generating insights automatically. In some exemplary embodiments, by supplying LLMs with richly structured failure contexts, LLMs may accelerate and enhance root-cause analysis. In some exemplary embodiments, outputs from the LLMs may be presented to users within their development environment, such as within an IDE.

In one scenario, a user may utilize an AI-based code editor such as Curser™, to develop code, query failures, understand code behavior, and attempt to obtain root causes of failures. For example, a developer may ask the AI agent of Curser™ to provide a general overview of the failures in the production environment. In such cases, the LLM engine of Curser™ may utilize an MCP layer to access the reported data, and generate useful information for developers that takes into account the production data, the contextual data of incident events of interest, or the like. For example, the agent may provide the developer with a list of incident events in the production environment, sorted according to one or more filters such as a frequency of each event type, most recent instances of each event type, or the like.

In some exemplary embodiments, using the reported data, developers may receive remediation suggestions, indications of failure root causes, or the like, such as immediate, structured context that maps failures to their root cause. In some exemplary embodiments, developers may be able to link failures to their originating endpoints, to their effect on the endpoint requests, or the like, even in dynamic languages, with minimal performance impact.

One technical effect of the disclosed subject matter may be providing an automated tracking system for filling in crucial data gaps regarding software failures in a live production. Using the disclosed subject matter, code failures may be mapped to their endpoint, the result of their return event, or the like, and rich contextual data regarding the failures may be extracted.

Another technical effect of the disclosed subject matter is providing developers with comprehensive, low-overhead insights into application behavior in production environments. The disclosed subject matter enables users such as developers to gain access to insights and informed language model engines, thereby assisting the users with understanding and solving coding issues. The tracked data may be ingested and/or provided to developers or automated LLMs for faster mean-time-to-repair, and increased repair accuracy.

Yet another technical effect of the disclosed subject matter is collecting rich contextual data only for failure events that are most likely to be of interest, e.g., failure events that were not encountered before, failure events that failed in the past, failure events that failed in the past and were not encountered more than a specified number of times, or the like. Because deep contextual data is collected only for incident events of interest, e.g., newly encountered events, overall memory and bandwidth consumption remain bounded and low even under heavy request volumes. This reduces the resource consumption, and reduces interruptions to the endpoint execution flow, while ensuring that full contextual data is extracted for events of interest.

In some exemplary embodiments, contextual data such as stack traces and function parameters may be captured for events of interest only. In some exemplary embodiments, a stack trace may list all the active stack frames, showing the sequence of function calls that led to that point. In some cases, each stack frame in the stack trace may comprise information specific to that function's execution, such as local variables, parameters, the return address after the function completes, a pointer to the previous stack frame, or the like, which may be memory consuming. By reporting heavy data such as stack traces only for novel and impactful failures, such as failures that are newly encountered, and performing lightweight tracking for other failures, the disclosed subject matter provides a cost-effective and resource conserving solution that balances completeness with bandwidth. The lightweight tracking enables the system to scale with minimal impact on production latency.

Yet another technical effect of the disclosed subject matter is providing users with comprehensive and enriched tracked data that cannot be tracked using other tools. The system delivers detailed, actionable diagnostics for service-level and function-level failures. For example, the disclosed subject matter enables to link endpoint requests with function exceptions, enabling to identify the effect of function exceptions on the return event of the endpoint request. Providing developers with this data may enhance their error analyses, debugging processes, performance optimization, or the like.

Yet another technical effect of the disclosed subject matter is enabling personalized tracking of failures, performance events, or other triggering events. By enabling users to define their own triggering events, and identifying their occurrence in the production environment during the lightweight tracking, the disclosed subject matter enhances personalization of software tracking and enhances the human-machine interaction.

Yet another technical effect of the disclosed subject matter may be improving the software development process, ultimately leading to more efficient and error-free code development. The disclosed subject matter enhances the development process by providing real-time tracking of function-level and endpoint-level failures. For example, by identifying that a function exception does not cause the endpoint request to fail, developers can focus their resources on the actual source or root causes of request failures. As another example, the disclosed subject matter can be used to provide interfaces that let developers browse a list of incidents and, from there, drill down into the detailed contextual records that supply all requisite forensic information. The disclosed subject matter may provide for one or more technical improvements over any pre-existing technique and any technique that has previously become routine or conventional in the art. Additional technical problems, solutions, and effects may be apparent to a person of ordinary skill in the art in view of the present disclosure.

Referring now to FIG. 1 showing a block diagram of a system that utilizes the disclosed subject matter, in accordance with some exemplary embodiments of the disclosed subject matter.

In some exemplary embodiments, the system may comprise a Live Production Environment 100 where software is deployed and executed. Live Production Environment 100 may be an actual operational environment where finalized and tested software, applications, or systems are deployed and made available to end-users.

In some exemplary embodiments, Live Production Environment 100 may comprise an execution platform that executes deployed software, referred to as the Target Software 110. For example, the execution platform may comprise one or more edge devices, computer nodes, processors, servers, or the like, that are used for executing Target Software 110. In some exemplary embodiments, Target Software 110 may result from compilation or, for dynamic and/or interpreter-based languages, may be the source code itself interpreted at runtime. In some exemplary embodiments, Target Software 110 may or may not be instrumented, such as to allow tracking thereof by a tracker object such as Tracker 120.

In some exemplary embodiments, Tracker 120 may be deployed within Live Production Environment 100, and may be configured to track and analyze the execution of Target Software 110. In some exemplary embodiments, Tracker 120 may comprise an SDK, a sensor, a library, agent, runtime extension, logging tool, or the like. In some exemplary embodiments, Tracker 120 may be executed within Live Production Environment 100, within a process of the execution of Target Software 110, externally thereto, or the like.

In some exemplary embodiments, Tracker 120 may track invocations of endpoints, such as using one or more hooks, and open a lightweight tracking for each invoked endpoint. In some exemplary embodiments, during the lightweight tracking, Tracker 120 may monitor the execution to identify compliance with trigger conditions of defined triggering events. In some exemplary embodiments, triggering events may or may not cause a deep contextual inspection to be invoked by Tracker 120, e.g., according to the steps of FIG. 3. This may allow Tracker 120 to provide detailed insights into the runtime behavior of Target Software 110, offering valuable data for performance analysis, failure analysis, and optimization while minimizing the impact on the running system.

For example, Tracker 120 may initiate lightweight tracking upon identifying an invocation of an endpoint, e.g., Endpoint 112. During the lightweight tracking, Tracker 120 may track the execution flow originating from Endpoint 112, which may include a plurality of function executions, e.g., executions of Functions 114, 116, or the like. In case an execution of a function in the flow causes a triggering event to be identified, such as in case of an exception, Tracker 120 may determine whether or not deep contextual inspections should be performed, e.g., by copying and maintaining the stack trace, the call chain, function parameters, inputs to callees, outputs from callees, or the like. For example, Tracker 120 may maintain such data at an in-process memory, externally to the process such as in disk storage or other persistent storage, or the like. In case of a new instance of a triggering event (e.g., with a new signature not found in a signature database such as Tagged Signature Database 130), Tracker 120 may extract the contextual data, and tag the signature according to the result of the execution flow, e.g., according to Termination 118 at an end of the flow, showing whether the request of Endpoint 112 was completed successfully.

It is noted that although Tagged Signature Database 130 is depicted externally to Live Production Environment 100, this is a non-binding example, and Tagged Signature Database 130 may be internal thereto.

In some exemplary embodiments, Tracker 120 may log production information regarding various aspects of the code elements. For example, Tracker 120 may record and/or aggregate performance parameters associated with invocation rates of incidents, execution times, cross-service interactions, resource consumption, memory usage, or the like. In some exemplary embodiments, Tracker 120 may aggregate and/or count a number of instances of each logging event, of each signature, each type of incident, or the like. In some exemplary embodiments, the performance parameters may be reported to a server such as Backend Server 140, a cloud, or the like, e.g., for performing further analysis.

In some exemplary embodiments, aggregated statistics such as the performance parameters may be reported to a server, such as Backend Server 140. In some exemplary embodiments, aggregated statistics such as the performance parameters may be reported periodically, such as every 2 seconds, every 5 seconds, every minute, any other predefined time window, at an end of the execution flow, or the like. In some cases, after data is reported to Backend Server 140, one or more data records may be cleaned, initialized, reset, or the like. For example, the counters of incident or other instances of triggering events may be initialized, execution time measurements may be initialized, or the like. In some exemplary embodiments, the data may be gathered, aggregated, managed, or the like, automatically without requiring manual intervention.

Figure 2:
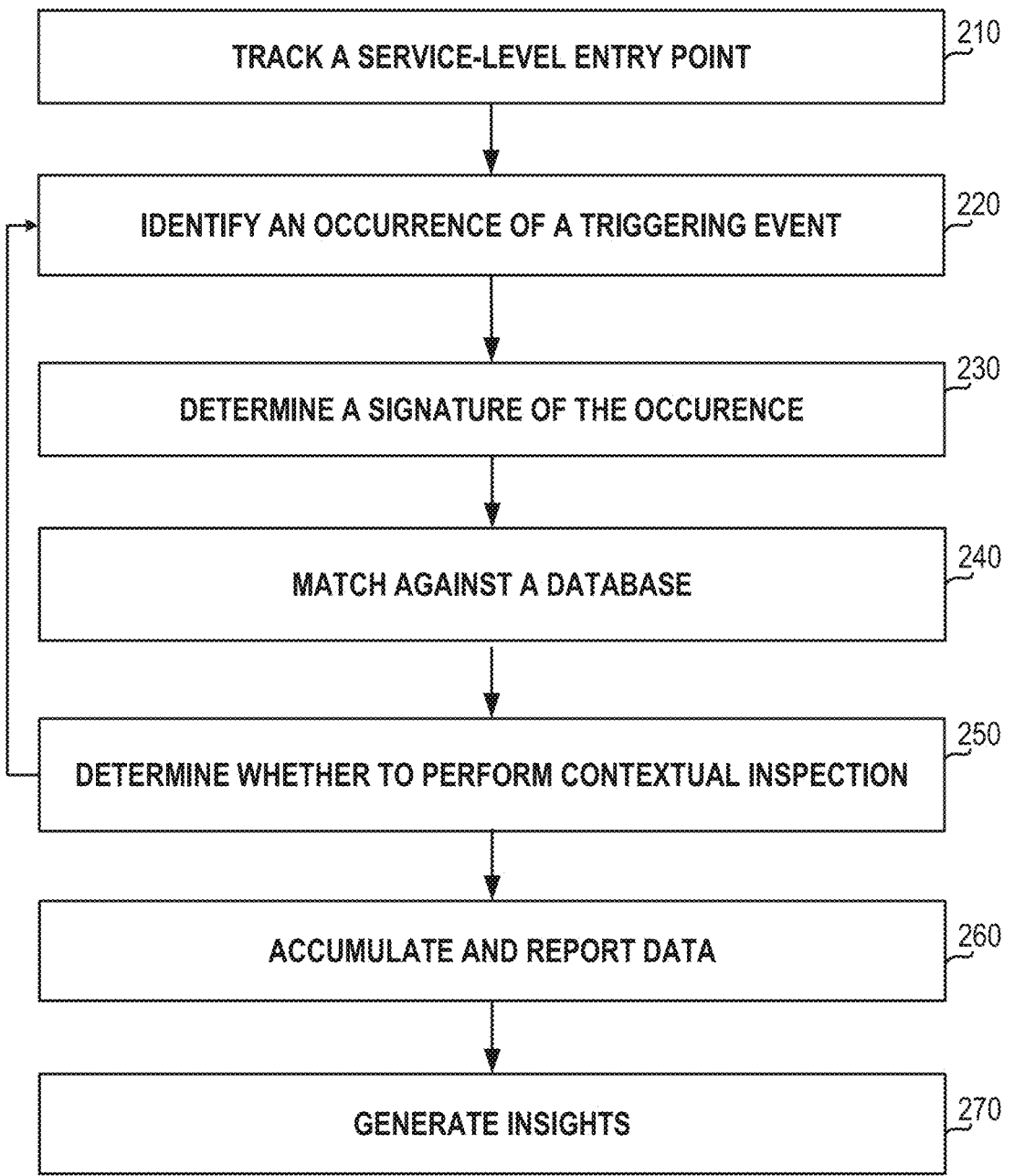
FIG. 2 shows a flowchart diagram of a method, in accordance with some exemplary embodiments of the disclosed subject matter.

Referring now to FIG. 2 showing an exemplary flowchart diagram of a method, in accordance with some exemplary embodiments of the disclosed subject matter.

On Step 210, tracking of an execution flow of an endpoint may be initiated, e.g., by an SDK executed on an edge device. In some exemplary embodiments, the edge device may execute the target software in which the endpoint is invoked, and the SDK may perform the endpoint tracking. For example, every function of the downstream execution flow of the endpoint may be tracked, a subset of functions may be tracked, or the like. In some exemplary embodiments, the target software that is being executed may be a single executable file or a set of executable files, that may be executed on a single computer, several computers, or the like. For example, the target software may be executed on an edge device in a live production environment.

In some exemplary embodiments, the live production environment may be a set of computers, e.g., including at least the edge device, where target software is deployed and executed. The live product environment may be utilized to execute executable software, referred to as "target software". For example, the target software may be developed using an interpreter-based language, a dynamic language, a non-dynamic language, or the like. It is noted that the disclosed subject matter is not limited to a specific execution manner and may be applied to compiled binary code, code executed by an interpreter, code executed by a two-pass interpreter, hybrid code comprising portions executed in different manners, or the like.

In some exemplary embodiments, the endpoint tracking may be initiated in response to identifying an endpoint invocation, such as when a service-level entry point of the target software is called. In some exemplary embodiments, during runtime, the SDK may monitor every time an endpoint is invoked, accessed, or the like. For example, endpoint invocations may be monitored using one or more frameworks such as Express™, Fastify™, Koa™, or the like. In some cases, for each identified endpoint invocation, a separate endpoint tracking may be initiated. In some cases, the execution flow from the endpoint may be tracked using one or more tracking techniques, such as by embedding hooks into the functions of the target software.

In some exemplary embodiments, the tracking the execution flow of the endpoint may initially comprise a lightweight tracking that monitors trigger conditions of one or more triggering events, e.g., invocations of functions within the execution flow, exceptions thrown by functions within the execution flow, latency issues with function executions, or the like.

On Step 220, an occurrence of a triggering event may be identified during the lightweight tracking of the execution flow of the endpoint. For example, a triggering event may occur within an execution of a function of the target software, in case the function is invoked in the execution flow of the endpoint.

In some exemplary embodiments, the triggering event may be defined, predefined, or the like, to include conditions such as an exception thrown during execution of a function within the endpoint's flow, an exception that is caught or handled (e.g., not a 500-series error), a latency indicating an error, a performance threshold breach by the function, a performance threshold breach by the endpoint (e.g., determined at an end of the execution flow), a personalized user-defined triggering event such as a next execution of a specified function, or the like. For example, a triggering event may be defined to comprise an endpoint-latency or function-latency value that exceeds the 99th percentile of the past seven-day sliding window. As another example, a user-defined triggering event may comprise a user request to obtain contextual data the next time a specified function is executed, the next type a specified incident event occurs (if the endpoint request is successful), or the like.

In some exemplary embodiments, triggering events may be defined by one or more trigger conditions. In some exemplary embodiments, in order to detect triggering events, one or more trigger conditions of the triggering events may be evaluated, tracked, or the like, during the lightweight tracking. In some exemplary embodiments, one or more of the trigger conditions, when complied with, may represent an occurrence of a triggering event. In some exemplary embodiments, the trigger conditions may comprise a set of one or more conditions that are evaluated at the service level, at the function level, or the like.

In some exemplary embodiments, in case one or more of the trigger conditions are fulfilled by an identified event, the event may be considered a triggering event. For example, a triggering event may comprise multiple trigger conditions, and compliance with one condition thereof may constitute an occurrence of the triggering event. As another example, a triggering event may comprise multiple trigger conditions, and compliance with a defined subset of two or more conditions may constitute an occurrence of the triggering event. As another example, a triggering event may comprise multiple trigger conditions, and compliance with all of them may be required to constitute an occurrence of the triggering event.

On Step 230, in case an occurrence of a triggering event is identified on Step 220, a signature of the occurrence of the triggering event may be generated, determined, calculated, or the like. In some exemplary embodiments, the signature may be computed based on a descriptor of the endpoint, a descriptor of the function, a descriptor of the triggering event, a combination thereof, or the like.

On Step 240, the signature may be matched against a tagged signature database. In some exemplary embodiments, the tagged signature database may comprise entries, each of which representing a signature that was encountered within a sliding window, and a tagging thereof.

In some exemplary embodiments, the database may be periodically clustered based on one or more signature attributes, to group recurring behaviors into clusters representing similar runtime patterns. For example, clustering may be recomputed periodically, in response to changes in the number of stored signatures, in response to changes in the diversity of stored signatures, in response to a user command, or the like.

In some exemplary embodiments, the signature may be matched either directly against individual entries of the database, or assigned to one of the pre-established clusters using a matching technique such as nearest-neighbor classification, centroid-based distance minimization, or another suitable similarity metric. For example, a signature may be assigned to a cluster if the computed distance between the signature and the cluster's centroid (or representative) is less than a predefined threshold. In some cases, in case the signature database is initialized and the clusters are not sufficiently stable, the signature may be matched directly against individual entries of the database, and after the clusters stabilize, the signature may be assigned to one of the existing clusters. In some exemplary embodiments, the cluster assignment may be used to inform whether the triggering event is likely to be of interest.

In some exemplary embodiments, once sufficiently stable clusters are formed within the database, each cluster may be analyzed or labeled based on whether its members historically resulted in incidents or non-incidents, based on a type of incidents, or the like. In some exemplary embodiments, when a new signature such as the signature determined on Step 230 is encountered, its assignment to a known cluster may enable to infer its likely impact based on prior outcomes within that cluster.

In some exemplary embodiments, individual signature records in the database may be tagged as a "non-incident" in case an execution flow that began at a respective endpoint and led to the signature record was completed successfully. In some exemplary embodiments, in case the execution flow reaches a conclusion and the endpoint returns a non-error response to the caller (e.g., with an acceptable latency), the result of the return event may be considered successful.

In some exemplary embodiments, individual signature records in the database may be tagged as an "incident" in case an execution flow that began at an originating endpoint and led to each signature record ended in failure. For example, a tagging of the signature as "non-incident" or "incident" may be extracted from the existing entry in the database. In some exemplary embodiments, in case the execution flow terminated with an error response or without returning a response (e.g., in case of a crash, a timeout, or the like), the result may be considered a failure.

In some exemplary embodiments, each incident event may comprise a specific type of incident with a corresponding signature, having a unique identifier. In some cases, instead of tagging a signature as "non-incident" or "incident", the signature may be tagged with a specific identifier of the incident (in case of an incident). For example, an incident event may comprise a defined exception in a defined execution flow that resulted in an error for a defined endpoint, and an occurrence thereof may be tagged accordingly.

In some exemplary embodiments, an instance of an incident event may comprise an occurrence of the incident event at a certain timestamp (e.g. happened at DD/MM HH:MM: SS) within the live production environment. In some exemplary embodiments, multiple instances of the same incident event may occur. For example, ten instances of the same incident event may occur within an elapsed hour, within the execution flow.

In some exemplary embodiments, the signature determined on Step 230 may be matched against the tagged signature database, to identify whether or not an existing entry in the database matches the signature. For example, an entry may match the signature of it includes an identical signature, a similar signature, or the like. In some exemplary embodiments, the signature may be considered to match an existing entry in the database if it matches one of the existing clusters of the database.

On Step 250, the SDK may determine whether or not a deep contextual inspection regarding the triggering event should be performed, e.g., based on the comparison of Step 240.

In some exemplary embodiments, a deep contextual inspection may comprise opening an investigation to investigate a result of the execution flow of the endpoint. For example, implementing the deep contextual inspection may cause the SDK to switch the tracking mode from the lightweight tracking mode to a full tracking mode, for at least a defined period of time, and to identify whether the endpoint request was completed successfully. In some exemplary embodiments, a deep contextual inspection may comprise accumulating contextual data associated with the triggering event, such as a stack trace, call chain, function parameters, related metrics, or the like.

In some exemplary embodiments, contextual data of the triggering event may comprise a stack trace at a time of the occurrence of the triggering event. In some exemplary embodiments, the contextual data may comprise values of parameters of the function that is associated with the triggering event, values of parameters of functions in the call chain of the function that is associated with the triggering event, or the like. In some exemplary embodiments, in case the triggering event is an exception thrown during the execution of a function, the contextual data may comprise a descriptor of the exception, a payload of the exception, an error message of the exception, or the like. In some exemplary embodiments, in case the triggering event is a performance event of the function, the data may comprise one or more performance measurements. In some cases, the contextual data may comprise a chain of function invocations leading to the occurrence of the triggering event. For example, the chain of function invocations may be extracted from a stack trace, or from a mock stack disclosed in U.S. patent application Ser. No. 19/233,338 filed Jun. 10, 2025, titled "LOGGING TOOL", which is herein incorporated by reference in its entirety without giving rise to disavowment.

In some exemplary embodiments, a deep contextual inspection may be performed in case the triggering event is determined to be of interest, e.g., in case it is newly encountered with respect to the signature database, in case it is estimated to result in an incident, in case it was not encountered a great number of times, a combination thereof, or the like. For example, if the signature was encountered before (as evident by the database matching) and not tied to a true incident, extracting heavy contextual data for the instance may be redundant, and may constitute a duplication of the previous tracking. In some exemplary embodiments, the determination of whether to implement a deep contextual inspection may be performed according to the flow of FIG. 3.

It is noted that instances of triggering events, such as instances of an incident event, can occur a great number of times within a production environment, such as thousands of times per second. Performing a deep contextual inspection for all such instances (even if tagged as incidents) may be extremely resource consuming, e.g., even unfeasible in some cases, and may not necessarily provide additional data. In order to reduce resource consumption while tracking important and significant events, the deep contextual inspections may be performed only in case the triggering event is determined to be of interest. For triggering events that are not of interest, only lightweight tracking may be performed.

In some exemplary embodiments, as part of the lightweight tracking, the SDK may count instances of a triggering event, e.g., all instances, by gathering an indication of their occurrences regardless of their tagging, and regardless of whether or not deep contextual inspections were performed. In some exemplary embodiments, other metrics, such as metrics associated with the contextual data of a triggering event, may only be gathered for events of interest.

In some exemplary embodiments, in case a deep contextual inspection is performed for a triggering event, the signature may be tagged and added as a new entry to the signature database. For example, the tagging may be performed at an end of the execution flow, according to whether or not the endpoint request was successful or ended in failure.

In some exemplary embodiments, Steps 220-250 may be performed iteratively, for each occurrence of a triggering event that is identified in the execution flow. For example, each occurrence of a triggering event, the SDK may determine whether a deep contextual inspection should be performed, whether the instance of the triggering event is of interest, or the like, and accumulate contextual data in case the instance is of interest.

In some cases, in case a signature of a first instance of a trigger event is newly encountered, and absent from the signature database, subsequent second instances with the same signature that are identified in the same execution flow may not necessarily cause a deep contextual inspection to be performed (although they are also absent from the database). For example, in case Functions 114 and 116 of FIG. 1 have a same signature, and the signature is absent from the signature database, contextual data may be captured and reported for Function 114 and not necessarily for Function 116. The second instances may be considered collectively as part of the investigation of the first instance, and the tagging of the first instance, performed at the end of the execution flow, may represent the results of the execution flow for the second instances.

On Step 260, data regarding the execution flow of the endpoint may be accumulated and selectively reported, e.g., to a backend server. For example, since many instances of triggering events may occur within the same execution flow, the data may comprise a plurality of captured contextual data logs, lightweight data logs, or the like. In some exemplary embodiments, after data is accumulated, the SDK may then decide which information to report and when to do so.

In some exemplary embodiments, the reporting and/or transmission of data from the SDK may be performed selectively. In some exemplary embodiments, the selective sending of the data may be performed at the end of the execution flow. For example, since many instances of triggering events may occur within the same execution flow, the decision regarding the reporting of data may be made after termination of the execution flow, such as to ensure the performance of the endpoint request is not significantly slowed down. In other cases, the selective sending of the data may be performed at any other time, e.g., at a middle of the execution flow.

In some exemplary embodiments, contextual data may be accumulated and reported for triggering events of interest, such as an instance of a signature that is first encountered and is absent from the database, an instance of a signature that is encountered less than a defined number of times, or the like. In some cases, a record of contextual data may or may not have an identifier, such as a unique identifier.

In some cases, contextual data may be accumulated and not reported. For example, in case an instance of a signature that is encountered less than a defined number of times, contextual data thereof may be accumulated. According to this example, in case the execution flow has a same result as the tagged signature in the database (e.g., both resulting as a same incident event or non-incident event), the contextual data may not necessarily be of interest, and may not necessarily be reported.

In some exemplary embodiments, while contextual data may not be gathered and reported in all cases, lightweight data may be captured and reported to the server, e.g., in all cases, according to a selected sampling rate, or the like. For example, lightweight data may comprise an indication of the occurrence of the triggering event, the signature of each instance of a triggering event, an identifier of the triggering event, an associated endpoint, a number of occurrences of a triggering event, or the like. In some cases, the SDK may gather statistics regarding instances, such as a last time they occurred (e.g., ongoing, a number of minutes ago, or the like), a frequency of their occurrences, or the like, and report such statistics.

In some exemplary embodiments, for triggering events of interest, such as an instance of a signature that is first encountered and is absent from the database and results in an incident event, the occurrence of the triggering event may be determined to comprise an incident event. For example, based on the occurrence of the triggering event, a new incident event may be generated, determined, or the like, e.g., to include at least the signature. In some cases, the new incident event may be reported to the server.

In some exemplary embodiments, by providing the server with data regarding triggering events of an execution flow of an endpoint, including detailed contextual data for each significant triggering event, the server may be able to fill the existing data gap between endpoints and data failures. For example, the disclosed subject matter enables to gather data regarding function failures after an exception is thrown, and to link such data to the endpoint that triggered the execution flow that led to the function invocation, and to the result of the execution flow.

On Step 270, one or more insights may be generated based on the reported data, e.g., at a backend server obtaining the reported data, an insight engine, a language model engine that has access to the reported data, or the like.

In some exemplary embodiments, the insights may be embedded in a development environment such as an Integrated Development Environment (IDE), or in any other development environment, testing environment, version control environment, or the like. For example, an IDE may be a software application that provides a set of tools for software development, and facilitates the creation, modification, testing, debugging, and deployment of software programs in one or more programming languages. The IDE may support various software development methodologies, such as agile, waterfall, or test-driven development. The IDE may be configured to support one or more programming languages, such as Java™, Python™, C#™, C++™, JavaScript™, PHP™, Ruby™, or Swift™. The IDE may also be configured to support one or more programming platforms, such as web, mobile, desktop, cloud, or embedded. The IDE may also be configured to support one or more programming frameworks, such as Node.js™, Angular™, React™, Django™, Laravel™, Spring™, or Flutter™. The IDE may also be configured to support one or more programming standards, such as HTML, CSS, XML, JSON, or SQL.

In some exemplary embodiments, the IDE may comprise a user interface that allows the user to interact with the various tools and features of the IDE. The user interface may include a code editor, a compiler, a debugger, a terminal, a version control system, a code navigator, a code generator, a code analyzer, a code formatter, a code refactoring tool, a code documentation tool, a code testing tool, a code deployment tool, and other tools that assist the user in software development. The user interface may also provide graphical representations of the software program, such as flowcharts, diagrams, or user interface mockups.

In some exemplary embodiments, the IDE may or may not comprise an insight engine, which may be used to obtain the reported data and generate and/or present based thereon insights to developers. For example, the server may provide the insights, and/or the reported data in its original form, to the IDE. In other cases, the IDE may obtain insights from an external insight engine and present them to developers. For example, the backend server may or may not utilize the reported data to generate one or more insights. As another example, a language model employed by the IDE may utilize the reported data to generate one or more insights. As another example, a language model external to the IDE may utilize the reported data to generate one or more insights.

In some exemplary embodiments, the insights may comprise the reported data itself, a statistically aggregated form of the reported data, a processed version of the reported data, or the like.

In some exemplary embodiments, the IDE may or may not employ one or more language models such as one or more LLMs, one or more Small-language models (SLMs), or the like. For example, the language models may be used to assist users with understanding the functionality of code elements, the root source of errors, the root cause of production failures, or the like. For example, the language models may enable users to chat, using natural language questions, regarding coding elements. In some exemplary embodiments, an interface between the backend of the language models and the development environment, e.g., the IDE, may comprise an IDE extension, plugin, adapter, or the like, such as a Model Context Provider (MCP) interface or standard for handling contextual prompts.

In some exemplary embodiments, the language models and/or their interface may be configured to obtain user-inserted input, such as a natural language question, instruction, or the like, and generate a prompt based thereon. The prompt may be enriched with the reported data. In other cases, the MCP may enable the LLM engine to access the reported data, without incorporating the data into the prompt. In some exemplary embodiments, an employed language model that obtains the prompt may utilize the reported data to provide enhanced feedback to the user. In some exemplary embodiments, the feedback may be enhanced, at least since it may take into account contextual data of production failures.

In some exemplary embodiments, identified incident events may be presented to users via the IDE or any other user interface, along with their types, an endpoint flow to which they belong, a number of their instances, rich contextual data of the incident events, performance metrics (date last seen, rate of instances per day), filters per selected timeframe, or the like. For example, incident events may be filtered according to a selected time frame (past 1 hr, past 24 hrs), a service selector, a free text search, or the like. In some cases, incidents may be sorted by services, endpoint, root function, rate/day, a date last seen, or the like.

In some cases, incident details may be presented via a table, a chart, a graph, or the like. For example, a table may be generated to display, for each instance of an incident event, its endpoint, its type (e.g., a 500-series error, a slowdown, or the like), its service, a root function causing the incident, a 'last seen' date (e.g., time of last execution in production), a rate of executions of the incident event per day or per other time unit, a count of contextual data logs that were reported and/or collected for the incident, a remediation action associated with the incident, or the like.

For example, a tab may present a high-level overview of incident details, and upon a user selection of a specific incident from the overview, an incident page or window may be opened, presented, or the like. According to this example, the incident page may comprise a type of the incident (e.g., a 500-series error, a slowdown, or the like), a unique identifier of the incident, its originating endpoint, a total count of instances of the incident, or the like. In some cases, the incident page may comprise a table or list for contextual data that was captured for the incident. For example, for each log of contextual data, the table may indicate a timestamp of the log, an identifier of the contextual data log, or the like. In some cases, the incident page may comprise an action control that, when selected, copies all logs of contextual data that were captured for the incident, e.g., within a sliding window, overall, or the like.

In some cases, a high-level overview of endpoints may be presented, and upon a user selection of a specific endpoint from the overview, an endpoint page may be opened. In some cases, the endpoint page may display, for each endpoint, its type, an error summary showing errors of functions within the endpoint execution flow, failures of the endpoint request, a 'last seen' date (e.g., time of last endpoint request in production), a rate of invocations of the endpoint per day or per other time unit, a count of contextual data logs that were reported and/or collected for the endpoint, a remediation action associated with the endpoint, or the like.

Figure 3:
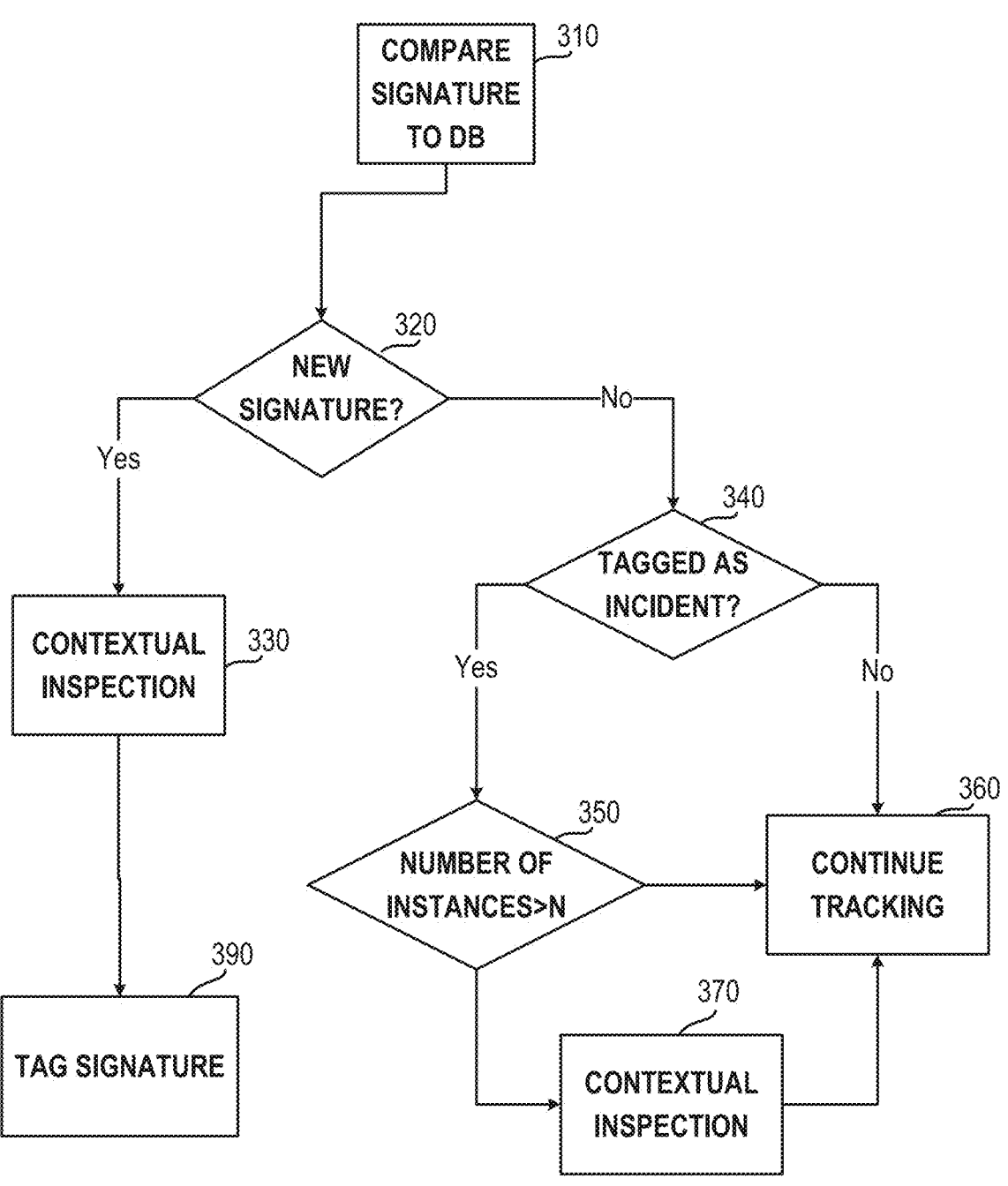
FIG. 3 shows a flowchart diagram of a method, in accordance with some exemplary embodiments of the disclosed subject matter.

Referring now to FIG. 3 showing an exemplary flowchart diagram of a method, in accordance with some exemplary embodiments of the disclosed subject matter.

On Step 310, a signature generated for an occurrence of a triggering event, such as the signature of Step 230 of FIG. 2, may be matched against a tagged signature database. In some exemplary embodiments, a determination of whether to perform a deep contextual inspection of the event may be performed based on the comparison to the database. In some exemplary embodiments, the tagged signature database may be queried to determine whether the signature appears in the tagged signature database. In some exemplary embodiments, based on the query, the signature may be identified as present in the database or absent therefrom.

On Decision Step 320, a decision may be made based on the comparison to the database. In some exemplary embodiments, in case the signature does not appear in the tagged signature database, the method flow may proceed to Step 330. In some exemplary embodiments, in case the signature does appear in the tagged signature database, the method flow may proceed to Step 340.

On Step 330, a deep contextual inspection of the occurrence of the triggering event may be performed. In some exemplary embodiments, contextual data regarding the triggering event may be accumulated, maintained, or the like.

In some exemplary embodiments, in addition to accumulating the contextual data, an investigation may be opened to track a result of the execution flow and tag the event in the database accordingly. For example, the execution flow of the endpoint may be tracked until its closure. In some exemplary embodiments, after reaching an end of the execution flow of the endpoint, the execution flow may be determined to be completed successfully or to have ended in failure.

On Step 390, the signature may be tagged according to the result of the execution flow. For example, the signature may be tagged as an incident event or a non-incident event. In some cases, the tagging may indicate, for an incident, the specific incident type.

On Decision Step 340, in case the signature is located in the tagged signature database, a decision may be made based on a tag of the signature in the database.

In some exemplary embodiments, in case the signature is tagged as an incident event (denoted 'yes'), the method flow may proceed to Decision Step 350. In some exemplary embodiments, in case the signature is tagged as a non-incident event (denoted 'no'), the method flow may proceed to Step 360.

On Step 360, the lightweight tracking of the endpoint may continue without performing a deep contextual inspection, and without tagging the event. The lightweight data tracking may continue, during which lightweight data such as the occurrence of the non-incident event, a count thereof, or the like, may be accumulated.

On Decision Step 350, in case the signature is tagged as an incident event, a decision may be made based on a count of occurrences of the signature. For example, the count may be compared to a threshold (denoted 'N'), and in case the number of occurrences of the signature is greater than the threshold, the method flow may continue to Step 360. In case the number of occurrences of the signature is lesser than the threshold, or equal thereto, the method flow may continue to Step 370.

On Step 370, a deep contextual inspection of the occurrence of the triggering event may be performed, e.g., similar to Step 330. After extracting and/or copying the contextual data of the triggering event, the method flow may continue to Step 360.

The present disclosed subject matter may be a system, a method, and/or a computer program product. The computer program product may include a computer readable storage medium (or media) having computer readable program instructions thereon for causing a processor to carry out aspects of the present disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a hard disk, a random-access memory (RAM), a read-only memory (ROM), an erasable programmable read-only memory (EPROM or Flash memory), a static random-access memory (SRAM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a Local Area Network (LAN), and a Wide Area Network (WAN). The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language, aspect oriented programming language, procedural programming language, or the like. The computer readable program instructions may execute entirely on the user's computer, partly on the user's computer, as a stand-alone software package, partly on the user's computer and partly on a remote computer or entirely on the remote computer or server. The remote computer may be connected to the user's computer through any type of network, including a LAN, a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter.

Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The computer readable program instructions may be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description, but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments.

What is claimed is:

1. A system for monitoring a target software that is executed in a live production environment, the system comprising:

an edge device executing the target software in the live production environment;

a backend server;

a tagged signature database;

the edge device is configured to:

initiate an endpoint tracking for tracking an execution flow of an endpoint of the target software, in response to identifying a service level entry point of the endpoint of the target software, wherein the tracking the execution flow of the endpoint comprises automatically monitoring invocations of functions within the execution flow of the endpoint;

determine whether to open an investigation to investigate a result of the execution flow of the endpoint, the determination of whether to open the investigation is based on:

identifying an occurrence of a triggering event during tracking of the execution flow of the endpoint, the occurrence of the triggering event occurs during an execution of a function of the target software;

computing a signature of the occurrence of the triggering event, the signature is computed based on:

a descriptor of the endpoint, a descriptor of the function, and a descriptor of the triggering event;

querying the tagged signature database to determine whether the signature matches a cluster of signatures within said tagged signature database; and determining to open the investigation in case the signature does not match any cluster of said tagged signature database;

in response to reaching an end of the execution flow of the endpoint, and in case of an open investigation, tag the signature as an incident event or a non-incident event based on the result of the execution flow of the endpoint;

update said tagged signature database with the tag of the signature; and selectively send data regarding the execution flow of the endpoint to said backend server, wherein the data comprises at least the signature.

2. The system of claim 1, wherein the selective sending of the data regarding the execution flow of the endpoint comprises:

in case the signature is tagged as the incident event, sending an indication of the occurrence of the triggering event; and selectively sending contextual data of the incident event.

3. The system of claim 2, wherein the contextual data is sent based on a determination that:

the triggering event was never encountered before;

the triggering event was not encountered during a sliding window; or a user request regarding the triggering event.

4. The system of claim 2, wherein the contextual data of the occurrence of the triggering event comprises a stack trace at a time of the occurrence of the triggering event.

5. The system of claim 1, wherein the edge device is configured to identify, during the execution flow, multiple occurrences of multiple triggering events, wherein the data comprises multiple signatures of the multiple triggering events.

6. The system of claim 1, wherein the data comprises: values of parameters of the function, wherein the values of the parameters of the function are obtained after the determination to open the investigation.

7. The system of claim 1, wherein the data comprises: a chain of function invocations leading to the occurrence of the triggering event.

8. The system of claim 1, wherein the triggering event comprises a function exception within the execution flow of the endpoint.

9. The system of claim 1, wherein the triggering event is a throw of an exception during the execution of the function, wherein the data comprises: a descriptor of the exception and a payload of the exception.

10. The system of claim 1, wherein the triggering event is a performance event of the function, wherein the data comprises: a performance measurement.

11. The system of claim 1, wherein the triggering event comprises a performance threshold that is breached by at least one of: the function and the endpoint.

12. The system of claim 1, wherein said tag the signature comprises tagging the signature as the incident event in case the result of the execution flow of the endpoint is a failure, and tagging the signature as the non-incident event in case the result of the execution flow of the endpoint is a success.

13. The system of claim 1, wherein the selective sending of the data is performed at the end of the execution flow.

14. A method comprising:

executing, by an edge device, a target software in a live production environment;

identifying, by the edge device, a service level entry point of the endpoint of the target software;

initiating, by the edge device, and in response to the identifying of the service level entry point, an endpoint tracking for tracking an execution flow of an endpoint of the target software, wherein the endpoint tracking comprises automatically monitoring invocations of functions within the execution flow of the endpoint;

determining, by the edge device, whether to open an investigation to investigate a result of the execution flow of the endpoint, the determination of whether to open the investigation is based on:

identifying an occurrence of a triggering event during tracking of the execution flow of the endpoint, the occurrence of the triggering event occurs during an execution of a function of the target software;

computing a signature of the occurrence of the triggering event, the signature is computed based on: a descriptor of the endpoint, a descriptor of the function, and a descriptor of the triggering event;

querying a tagged signature database to determine whether the signature matches a cluster of signatures within said tagged signature database; and determining to open the investigation in case the signature does not match any cluster of said tagged signature database;

in case of an open investigation tagging the signature as an incident event or a non-incident event in response to reaching an end of the execution flow of the endpoint, and based on the result of the execution flow of the endpoint;

updating said tagged signature database with the tag of the signature; and selectively sending data regarding the execution flow of the endpoint to a backend server, wherein the data comprises at least the signature.

15. The method of claim 14, wherein the selective sending of the data regarding the execution flow of the endpoint comprises:

in case the signature is tagged as the incident event, sending an indication of the occurrence of the triggering event; and selectively sending contextual data of the incident event.

16. The method of claim 15, wherein the contextual data is sent based on a determination that:

the triggering event was never encountered before;

the triggering event was not encountered during a sliding window; or a user request regarding the triggering event.

17. The method of claim 15, wherein the contextual data of the occurrence of the triggering event comprises a stack trace at a time of the occurrence of the triggering event.

18. The method of claim 14, wherein the data comprises: values of parameters of the function, wherein the values of the parameters of the function are obtained after the determination to open the investigation.

19. A computer program product comprising a non-transitory computer readable medium retaining program instructions, which program instructions when read by a processor, cause the processor to:

execute a target software in a live production environment;

identify a service level entry point of the endpoint of the target software;

initiate, in response to the identifying the service level entry point, an endpoint tracking for tracking an execution flow of an endpoint of the target software, wherein the endpoint tracking comprises automatically monitoring invocations of functions within the execution flow of the endpoint;

determine whether to open an investigation to investigate a result of the execution flow of the endpoint, the determination of whether to open the investigation is based on:

identifying an occurrence of a triggering event during tracking of the execution flow of the endpoint, the occurrence of the triggering event occurs during an execution of a function of the target software;

computing a signature of the occurrence of the triggering event, the signature is computed based on: a descriptor of the endpoint, a descriptor of the function, and a descriptor of the triggering event;

querying a tagged signature database to determine whether the signature matches a cluster of signatures within said tagged signature database; and determining to open the investigation in case the signature does not match any cluster of said tagged signature database;

tag the signature as an incident event or a non-incident event in response to reaching an end of the execution flow of the endpoint, in case of an open investigation, and based on the result of the execution flow of the endpoint;

update said tagged signature database with the tag of the signature; and selectively send data regarding the execution flow of the endpoint to a backend server, wherein the data comprises at least the signature.

* * * * *